OR 3,672,744

T 30325

June 27, 1972 D. H. STROPE ET AL 3,672,744

HOLOGRAPHIC SYSTEM AND PROCESS UTILIZING A WET CELL PHASE HOLOGRAM

Filed Oct. 6, 1970 3 Sheets-Sheet 1

INVENTORS
DOUGLAS H. STROPE
ALAN D. WILSON

BY [signature]
ATTORNEY

FIG. 2

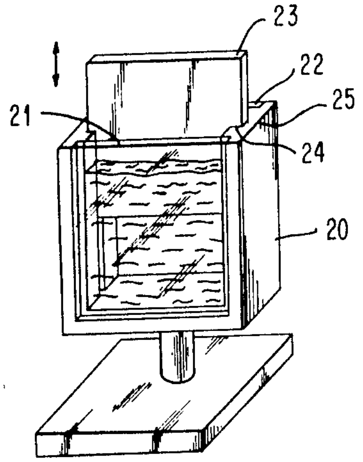

FIG. 3

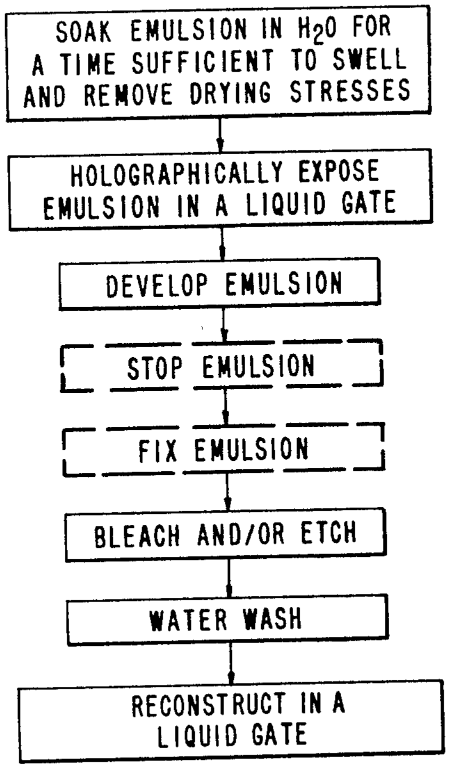

FIG. 5

| FIG. NO. | OBJECT TYPE | FIGURE PHOTOGRAPH EXPOSURE | | HOLOGRAPHIC EXPOSURE ERGS/$CM^2$ | RELATIVE NOISE | FIGURE OF MERIT ‡ |
|---|---|---|---|---|---|---|
| | | TIME, SEC | f/NO | | | |
| 4a | ACTUAL TEST CHART | 0.1 | 5.6 | N/A | N/A | N/A |
| 4b | DRY CONVENTIONAL AMPLITUDE HOLOGRAM | 0.75 | 5.6 | 600 | LOW, 1 | 1.0 |
| 4c | DRY CONVENTIONAL PHASE HOLOGRAM | 0.2 | 5.6 | 1200 | HIGH, 10 | 0.18 |
| 4d | WET-CELL AMPLITUDE HOLOGRAM | .33 | 5.6 | 200 | LOW, 1 | 6.9 |
| 4e | WET-CELL* PHASE HOLOGRAM | 0.04 | 5.6 | 200 | LOW, 1 | 56 |

* SAME HOLOGRAM AS FIGURE 4c BUT BLEACHED

‡ DEFINED AS:
(HOLOGRAM EFFICIENCY) ÷
(HOLOGRAM EXPOSURE) x
(RELATIVE NOISE)

INVENTORS
DOUGLAS H. STROPE
ALAN D. WILSON

BY [signature]
ATTORNEY

PHOTO OF OBJECT

AMPLITUDE HOLOGRAM

PHASE HOLOGRAM

WET CELL AMP HOLO

WET CELL PHASE HOLO

INVENTORS
DOUGLAS H. STROPE
ALAN D. WILSON
BY [signature]
ATTORNEY

United States Patent Office 3,672,744

Patented June 27, 1972

3,672,744

HOLOGRAPHIC SYSTEM AND PROCESS UTILIZING A WET CELL PHASE HOLOGRAM

Douglas H. Strope and Alan D. Wilson, Apalachin, N.Y., assignors to International Business Machines Corporation, Armonk, N.Y.

Filed Oct. 6, 1970, Ser. No. 78,535
Int. Cl. G02b 27/00
U.S. Cl. 350—3.5 5 Claims

ABSTRACT OF THE DISCLOSURE

A system and method for holography in which the recording medium is exposed and viewed immersed in a liquid which is effective to relieve the residual stresses in the medium.

BACKGROUND OF THE INVENTION

This invention relates to an improved process and structure for the practice of real time holographic interferometric analysis. The accuracy, stability and quality of a hologram is improved and the process for creation of the hologram is improved.

DESCRIPTION OF THE PRIOR ART

The application of holographic and interferometric techniques to the problems associated with the measurement of very small distortions of real objects has provided remarkable results in many situations. In the real time holographic interferometric technique a hologram is made of the unstressed stationary object by exposing a photographic plate to a reference beam and a beam or wave diffracted by the object. The plate is removed from the holder, developed and returned to the same position. Alternately, with a suitable cell it could be processed in situ. The object is again illuminated with coherent light and viewed through the developed plate. The processed hologram is illuminated to reconstruct an image of the object which is superimposed on the object. These two wave fronts—the light from the object and the hologram diffracted object image—tend to interfere and produce a total scene which contains information in the form of fringes. The fringes represent the distortion of the object due to an applied object stress.

Assuming that the photographic plate is repositioned on left in exactly the same position as it occupied during the initial exposure of the emulsion, the reconstructed image of the object superimposed on the real object will look normal when viewed through the hologram. In actual practice this result is never achieved and the scene is obscured and confused by a set of offset interference fringes caused by the lack of complete registration due to emulsion movements between the recorded diffraction pattern on the hologram and the real time diffracted wave from the object. Despite this shortcoming of the existing technique, a careful experimenter can obtain useful results by noting the difference between the interference fringes before and after the object is stressed. In areas where the fringes are close together or where stresses applied to the object cause fringes to appear superimposed on other fringes, even great care often fails to provide useful results.

In an effort to reduce the error introduced by removal of the photographic plate from its holder and its subsequent replacement into the same holder, plate holders have been devised which permit slight movement under sensitive control. The adjustment is very critical and frequently fails to provide the desired scene free of interference fringes.

SUMMARY OF THE INVENTION

The primary cause of the residual interference fringes which remain to obscure the object after positioning errors have been reduced has been found to be distortion of the emulsion. This distortion occurs both in the plane of the recorded pattern as well as in the thickness. A typical holographic plate may have an emulsion thickness of 15 microns in the dry state prior to exposure. During the wet processing cycle the emulsion swells to 45 microns. The normal drying process provides a final emulsion estimated to be a thickness of about 20 microns. This change in dimension is not uniform over the entire plate and therefore introduces serious distortion problems. Moreover, a given area of the emulsion will have a different stress function after normal processing than before processing. This usually results in a rough emulsion surface which produces a noisy holographic image.

By presoaking the plate in a liquid such as water before the exposure and holding the plate in a submerged state during exposure and reconstruction, the stresses normally produced in processing can be eliminated to provide a much improved system. Such a processed hologram is much less noisy, highly efficient and requires less exposure than its dry counterpart.

In addition to the elimination of the distortion introduced by developing, this process has been found to be fully effective to stress relieve the emulsion with regard to those internal forces set up during fabrication of the photographic emulsion. While these advantages alone would justify the additional complexity of the improved system, it has been found that the presoak and exposure in a liquid provides a four times increase in emulsion speed, a truly significant advantage in situations where holograms are being made of moving objects, weakly reflecting, and large objects.

It is therefore an object of our invention to provide an improved process and system for real time holography.

It is another object of our invention to provide a real time holographic system which is free of the residual interference bonds caused by emulsion distortion.

Still another object of our invention is to provide a process for the creation and use of a phase hologram which eliminates distortion due to changes in emulsion dimensions during processing.

The foregoing and other objects, features and advantages of the invention will be apparent from the following more particular description of preferred embodiments of the invention, as illustrated in the accompanying drawings.

DESCRIPTION OF THE DRAWINGS

FIG. 2 is an example of a plate holder for use in the system of FIG. 1.

FIG. 3 is a showing of the process steps.

FIG. 5 is a table setting forth a comparison of the examples shown in FIGS. 4*a*–4*e*.

Figure 1:
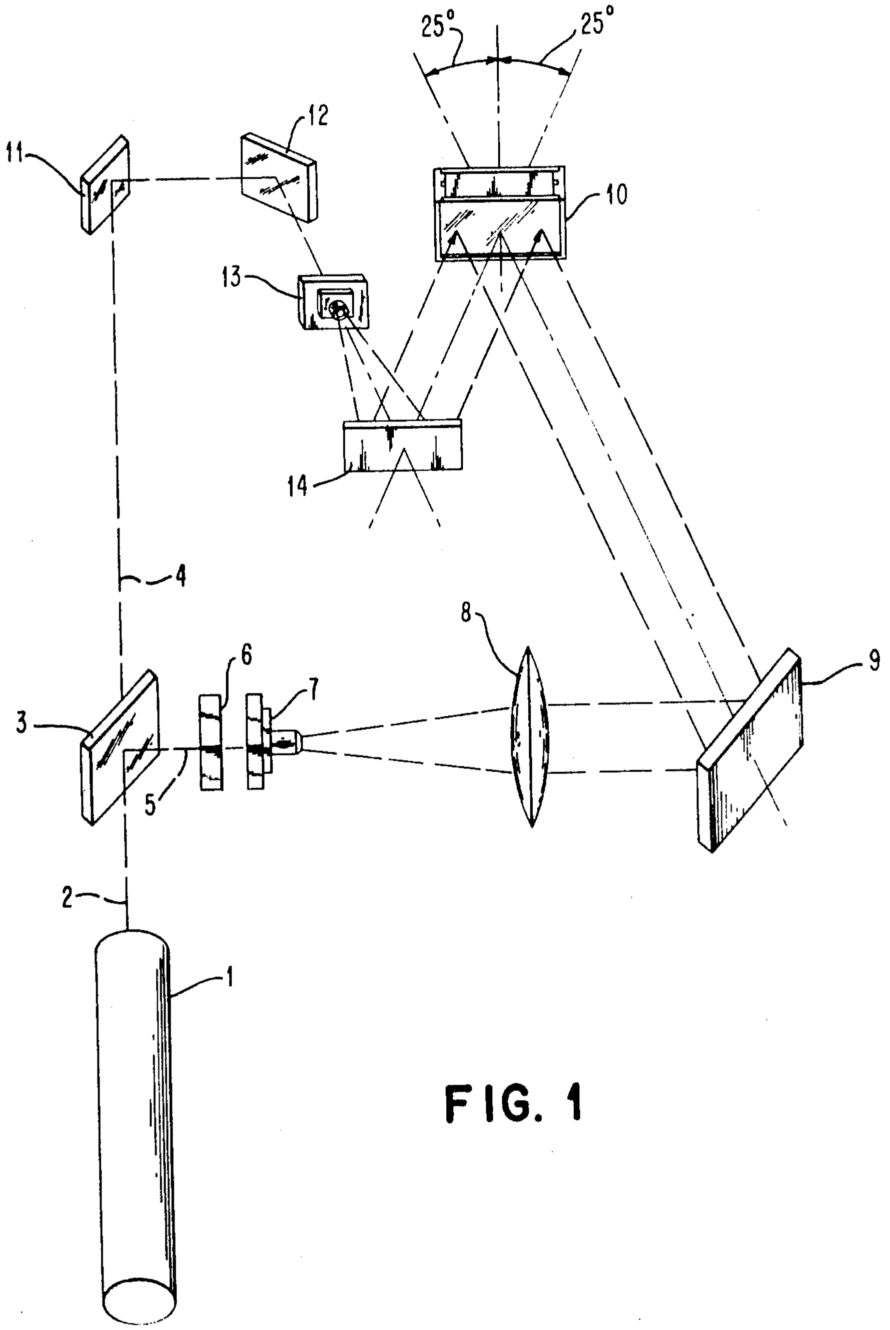
FIG. 1 is a physical layout of the optical system used to practice the invention.

The system shown in FIG. 1 is more or less typical of the arrangement used in real time holography. A laser 1 emits a beam 2 of coherent radiation in the visible spectrum (632.8 nm.) A beam splitter 3 is positioned to divide beam 2 into two components 4 and 5 having relative intensities of 88% and 12% with reference to the intensity of beam 2.

A neutral density filter 6 having a 9% transmissivity value further reduces the intensity of beam 5. A spatial filter 7 improves the spatial coherence of beam 5 by passing only the low spatial frequencies of beam 5. Lens 8 is used to collimate beam 5. A mirror 9 is used to position beam 5 in a fashion so that it impinges on the plate holder support means 10 at approximately 25° from the perpendicular. Beam 5 thus becomes the reference beam.

This arrangement was used to generate the samples shown in FIG. 4. The object was an optical test card rather than a three-dimensional device. It will be apparent to those skilled in the art that the relative intensities of beams 4 and 5 will differ with other objects. The intent is to provide an intensity ratio of about 1.5:1 between the reference and object waves. Because the test card is a diffuse object, the reflected light is not S-plane polarized. Therefore, the actual intensity ratio of the beams contributing to interference at the film holder is about 3:1.

As shown in FIG. 3, the first step in the practice of the claimed process is to thoroughly saturate the emulsion with water. This is accomplished by immersing the photographic plates in water. While the length of time required for saturation will vary depending on the thickness and other characteristics of the emulsion, a five-minute soak in water has been found to be adequate in the case of standard Kodak 649F plates.

Without allowing the plate to dry, it is inserted into the plate holder for a conventional simultaneous exposure by the object and reference beams. In the preparation of the examples shown in FIG. 4, Kodak 649F emulsion was used.

Subsequent to exposure, the plate is removed and developed without allowing the emulsion to dry. The developer can be any suitable type such as Kodak D–19. After development, the plate may be placed in a stop bath and agitated for a minute or less. This step is optional but preferred. The plate may then be immersed in a fix bath for 2–4 minutes, then washed in water for 30 minutes. The stop bath step is optional but is preferred.

The hologram is converted into a phase hologram by bleaching. It is the bleaching operation which converts the amplitude information into a phase type image by changing the index of refraction of the emulsion in accordance with the degree of exposure.

The bleach step is also carried out without allowing the plate to dry. A cupric halide bleach such as Kodak EB–2 is preferred. The plate is allowed to remain in the bleach both for the time required to clear the plate of any amplitude information plus an additional 2–4 minutes.

At the conclusion of bleaching, the plate is washed and returned to the plate holder 10, again without allowing the plate to dry. With the plate in exactly the same position as it was for the construction, the laser 1 is energized and the object viewed through the hologram at an angle such that the real object and the virtual image of the hologram appear to coincide.

Further information on processing techniques for phase type holograms is presented in "Techniques for Producing Low-Noise Improved Efficiency Holograms," by K. S. Pennington and J. S. Harper, Dec. 8, 1969, an IBM Research Report, available from IBM Thomas J. Watson Research Center, P. O. Box 218, Yorktown Heights, N.Y. 10598.

FIG. 2 is illustrative of a plate holder of the liquid gate type suitable for the practice of this invention. The gate has a generally U-shaped member 20 of a material such as aluminum. Transparent sides 21 and 22 of glass permit the plate 23 to be exposed and viewed. Epoxy cement may be used to secure the glass sides 21 and 22 to member 20. A pair of grooves 24 and 25 in member 20 are spaced to receive plate 23. Suitable springs and guide pins are positioned in the grooves to bias the plate against the back and one side of the grooves. This arrangement permits the plate to be reinserted to the same position after it has been withdrawn. The use of a photographic emulsion on thick (.250") glass plates is best because of plate stability. The plate is positioned with reference to the non-emulsion side.

Figure 4A:
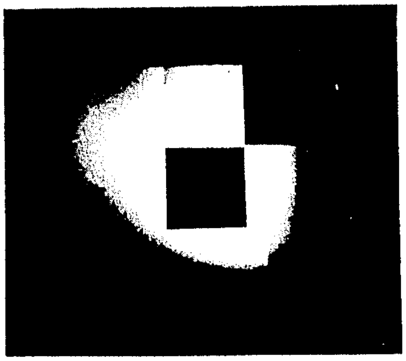
FIGS. 4*a*–4*e* are comparative examples of the results produced with and without this invention.
Figure 4B:
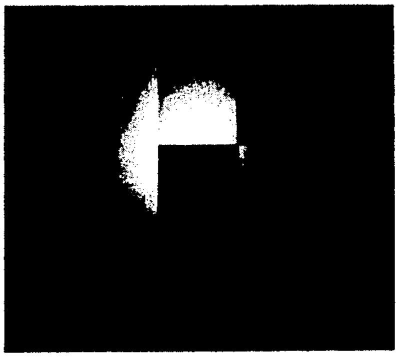

FIG. 4*a* is a photograph of the object used in the experiments to provide comparative results. In these experiments the object was illuminated with coherent 632.8 nm. light. Holograms of this object are made using the technique illustrated in FIG. 1. A conventional dry off-axis amplitude hologram made on Kodak 649F emulsion is the object for the photograph of FIG. 4*b*. Note that the object is being front illuminated. For this hologram and all the rest in FIG. 4 the ratio of the reference to object waves intensities is adjusted to produce a conventional hologram of high efficiency. The intensity ratio is about 1.5:1 (amplitude ratio is 1.25:1). The object used is a standard optical test card. It is a diffuse object and the light is not S-plane polarized upon reflection. Therefore, the actual beam ratio contributing to the interference at the hologram is probably about 3/1 (intensity). The P plane polarized light from the object acts as a bias level. The total holographic exposure for FIG. 4*b* is close to 600 ergs./cm.$^2$.

Figure 4C:
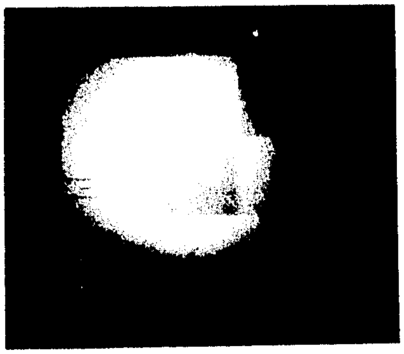
Figure 4D:
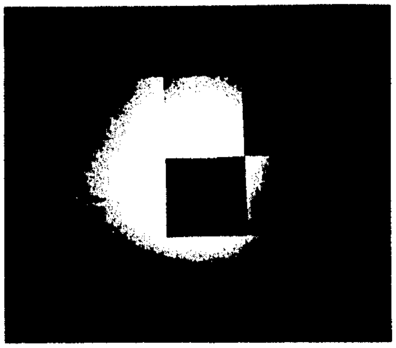
Figure 4E:
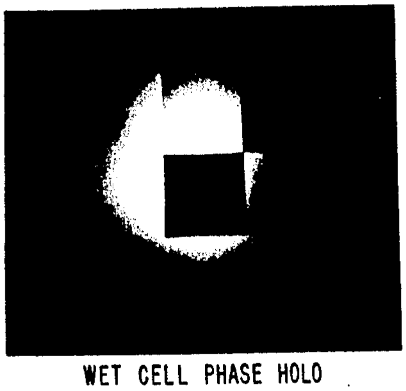

FIG. 4*c* is a dry conventional phase hologram obtained by bleaching for 12 minutes in an EB–2 bath. The holographic exposure—1200 ergs./cm.$^2$—twice that for an amplitude hologram—is such that one obtains an efficient phase hologram. This hologram is about four times as efficient as its dry amplitude counterpart. Slightly different exposure might produce a slightly greater efficiency. The 1200 ergs./cm.$^2$ has been found to yield satisfactory results. FIG. 4*d* is a photograph of a reconstruction of the wet-cell amplitude hologram. FIG. 4*e* is a photograph of a reconstruction of the wet-cell phase hologram. The photographs of FIGS. 4*a*–4*e* are all made so that the photograph images have equal (approximately so) density. The exposure times to do this are shown in the table of FIG. 5.

The table of FIG. 5 compares the relative hologram efficiencies, noise levels and construction exposures in terms of a Figure of Merit. The Figure of Merit for the dry phase hologram is low because of the high noise level. The wet-cell phase hologram is of low noise, very efficient and requires little holographic exposure which results in a very high Figure of Merit. The increase in film sensitivity for this wet-cell process is about a factor of 3 or 4. The efficiency of the wet-cell phase hologram increases by about 10 above the same amplitude hologram efficiency. Visually, the wet-cell holograms produce images as good or better than conventional dry amplitude holograms and do so with less construction exposure and at higher reconstruction efficiency.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A holographic method comprising the steps of:

(1) immersing a recording emulsion in only water for a period of time sufficient to relieve residual stresses in said emulsion, (2) exposing said emulsion, while remaining immersed in only water, to reference and object waves to form a latent hologram, at an energy level less than 25% of that used to form a dry phase hologram on said emulsion, (3) developing said emulsion, and processing said emulsion to form a phase hologram, (4) reconstructing the object of said hologram while said emulsion is immersed in only water.

2. The method of claim 1 wherein the reconstruction of step 4 includes a comparison of the reconstructed object with the real object.

3. The method of claim 1 wherein step 3 includes the steps of:

(a) fixing the emulsion (b) bleaching the emulsion to remove all amplitude information.

4. A real time holographic interferometric method utilizing a phase type hologram comprising the steps of:

(1) immersing a recording emulsion in only water for a time sufficient to relieve residual stresses in said emulsion, (2) exposing said emulsion, while remaining immersed in only water, to a reference wave and a wave diffracted by an unstressed object at an energy level less than 25% of that used to form a dry phase hologram on said emulsion, (3) developing said emulsion to provide a phase type hologram, (4) reconstructing the object of said hologram, while said emulsion is immersed in only water, so that the reconstructed image of the object may be viewed as superimposed on the real object, (5) applying a stress to the real object, (6) observing the interference fringes between the image of the reconstructed object and the real object in the stressed condition.

5. The method of claim 4 wherein the step 3 includes the steps of:

(a) developing the emulsion to produce an amplitude record, (b) bleaching said emulsion to eliminate the amplitude information and create a phase type hologram.

References Cited

Casler et al.: Applied Physics Letters, vol. 10, No. 12, June 1967, pp. 341–342.

Industrial Research: May 1969, pp. L1, L2, "Laser Applications."

Deelen et al.: Applied Optics, vol. 8, No. 5, May 1969, pp. 951–955.

DAVID SCHONBERG, Primary Examiner

R. J. STERN, Assistant Examiner

U.S. Cl. X.R.

96—27 H; 356—106